United States Patent [19]
Chen

[11] Patent Number: 5,217,580
[45] Date of Patent: Jun. 8, 1993

[54] WATER DISTILLER

[76] Inventor: Ching-Dien Chen, No. 550, Hsi Shih Rd., Feng Yuan City, Taichung Hsien, Taiwan

[21] Appl. No.: 970,837

[22] Filed: Nov. 3, 1992

[51] Int. Cl.⁵ .............................. B01D 3/00; C02F 1/04
[52] U.S. Cl. ................................. 202/185.2; 202/83; 202/185.5; 202/185.6; 202/190; 202/266; 202/242; 203/10; 203/99
[58] Field of Search .............. 202/185.2, 266, 242, 202/262, 83, 185.5, 185.6, 190; 203/10, 99, DIG. 17; 126/381

[56] References Cited

U.S. PATENT DOCUMENTS

| 825,178 | 7/1906 | Barnstead | 202/190 |
|---|---|---|---|
| 841,401 | 1/1907 | Hope | 202/190 |
| 902,097 | 10/1908 | Lowry et al. | 202/185.2 |
| 3,055,810 | 9/1962 | Skow | 203/10 |
| 3,957,589 | 5/1976 | Mayer | 202/190 |
| 4,052,267 | 10/1977 | McFee | 202/190 |
| 4,187,150 | 2/1980 | Rich | 202/190 |
| 4,269,663 | 5/1981 | McFee | 203/10 |
| 4,339,307 | 7/1982 | Ellis, Jr. | 202/190 |
| 4,342,623 | 8/1982 | Loeffler | 202/190 |
| 4,888,097 | 2/1989 | Palmer et al. | 203/10 |
| 4,894,123 | 1/1990 | Helmich | 203/10 |
| 5,059,287 | 10/1991 | Harkey, Jr. | 203/10 |

FOREIGN PATENT DOCUMENTS

| 2816233 | 10/1979 | Fed. Rep. of Germany | 203/10 |
|---|---|---|---|
| 3011574 | 10/1981 | Fed. Rep. of Germany | 203/10 |
| 0846682 | 9/1939 | France | 203/10 |
| 0005391 | 3/1979 | Japan | 203/10 |
| 0338953 | 11/1930 | United Kingdom | 202/190 |
| 0894936 | 4/1962 | United Kingdom | 203/10 |

Primary Examiner—Virginia Manoharan
Attorney, Agent, or Firm—Morton J. Rosenberg; David I. Klein

[57] ABSTRACT

A water distiller includes a base having a front portion for supporting a container and having a housing extended upward from the rear portion, a vessel disposed in the housing for containing water, a heater disposed below the vessel for heating the water contained in the vessel into steam, and an arm extended forward from the housing. A radiator is disposed in the arm for cooling the steam flowing into the arm, and the condensed water is collected in the container.

2 Claims, 2 Drawing Sheets

WATER DISTILLER

BACKGROUND OF THE INVENTION

1. Field of the Invention

The present invention relates to a water distiller.

2. Description of the Prior Art

A typical water distiller is disclosed in U.S. Pat. No. 4,052,267 to McFee, filed Jul. 7, 1975, in the patent, the cooling system including the radiator and fan assembly is disposed on top of the vessel and the boiler. Obviously, the cooling effect of the cooling system will be affected by the boiled water contained in the vessel, such that the distilling effect thereof is bad.

The present invention has arisen to mitigate and/or obviate the afore-described disadvantages of the conventional water distillers.

SUMMARY OF THE INVENTION

The primary objective of the present invention is to provide a water distiller which has an excellent distilling effect.

In accordance with one aspect of the invention, there is provided a water distiller comprising a base including a front portion having a platform formed therein for supporting a container and including a rear portion, a housing extended upward from the rear portion of the base, a vessel disposed in the housing for containing water, a heater disposed below the vessel for heating the water contained in the vessel into steam, an arm extended from an upper portion of the housing and located above the container, a motor and fan assembly disposed in the arm, a hopper coupled to the arm and located above the container, and a conduit including a first end coupled to an upper portion of the vessel and a second end connected to the hopper and including a coil disposed around the motor and fan assembly, whereby, the steam flowing through the conduit is cooled into condensed water by the motor and fan assembly, and the condensed water is collected in the container.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
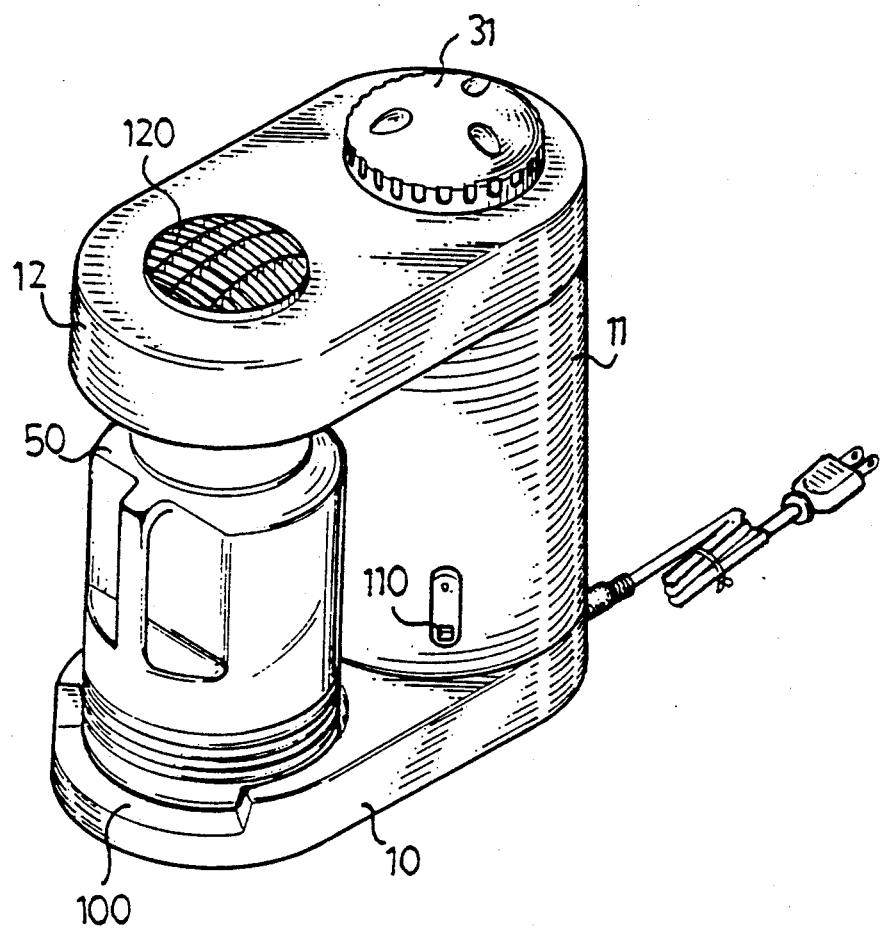
FIG. 1 is a perspective view of a water distiller in accordance with the present invention.
Figure 2:
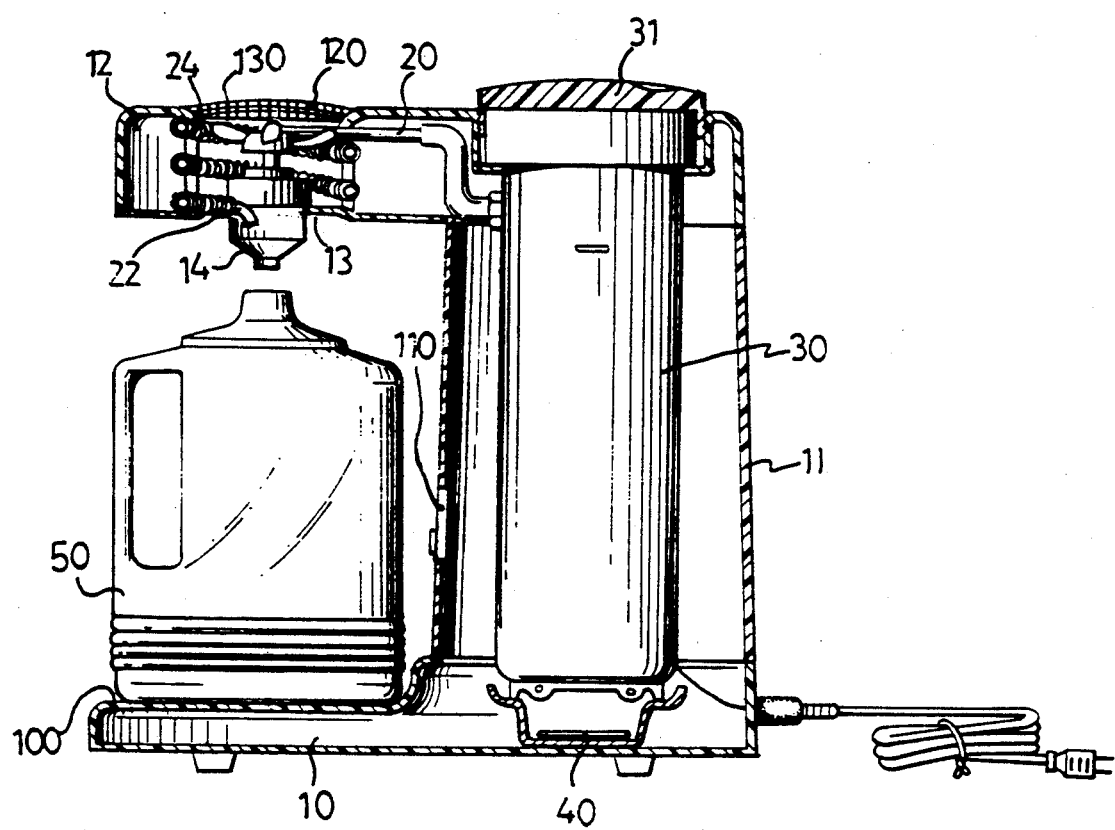
FIG. 2 is a schematic view of the water distiller.

Referring to the drawings, a water distiller in accordance with the present invention comprises a base 10 including a platform 100 formed in the front portion thereof for supporting a container 50 and a housing 11 extended upward from the rear portion thereof, an arm 12 extended forward from the upper portion of the housing 11 and having an opening 120 formed in the upper portion thereof, a vessel 30 disposed in the housing 11 for containing water and including an open top enclosed by a cover 31 which is removably disposed in top of the housing 11, a heater 40 disposed in the base 10 and disposed below the vessel 30 for vaporizing the water contained within the vessel 30, a switch 110 provided on the housing 11 for controlling the heating operations of the heater 40.

A motor 13 is disposed in the arm 12 and located above the container 50 and includes a fan assembly 130 coupled thereto, a hopper 14 is disposed below the motor 13 and located above the container 50, and a conduit 20 extends outward from the upper end of the vessel 30 and includes a coil 22 disposed around the motor 13 and fan assembly 130 and connected to the hopper 14 such that the steam may flow through the conduit 20 and the coil 22, the motor 13 and fan assembly 130 are provided to cool the vaporized water flowing through the coil 22 such that the steam condenses on the interior walls of the coil 22 of the conduit 20, the condensed water then flows into the hopper 14 and can be collected within the container 50. A plurality of fins 24 are formed around and along the coil 22 for facilitating the radiating effect or the cooling effect of the steam flowing through the coil 22.

It is to be noted that the radiating system or the radiator including the coil 22, and the motor 13 and fan assembly 130 is disposed in the arm 12 and is located away from the vessel 30, such that the radiating effect and the cooling effect of the steam has greatly improved over that of the conventional water distillers.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water distiller comprising a base including a front portion having a platform formed therein for supporting a container and including a rear portion, a housing extended upward from said rear portion of said base, a vessel disposed in said housing for containing water, a heater disposed below said vessel for heating said water contained in said vessel into steam, an arm extended from an upper portion of said housing and located above said container, a motor and fan assembly disposed in said arm, a hopper coupled to said arm and located above said container, and a conduit including a first end coupled to an upper portion of said vessel and a second end connected to said hopper and including a coil disposed around said motor and fan assembly, whereby, said steam flowing through said conduit is cooled into condensed water by said motor and fan assembly, and said condensed water is collected in said container.

2. A water distiller according to claim 1, wherein said conduit includes a wire wound around said coil for facilitating cooling effect.

* * * * *